United States Patent
Gramss

(10) Patent No.: US 6,588,071 B2
(45) Date of Patent: Jul. 8, 2003

(54) CLIP-LIKE MEMBER OF PLASTIC MATERIAL

(75) Inventor: Rainer Gramss, Iserlohn (DE)

(73) Assignee: ITW Automotive Products GmbH & Co. KG, Iserlohn (DE)

(*) Notice: Subject to any disclaimer, the term of this patent is extended or adjusted under 35 U.S.C. 154(b) by 0 days.

(21) Appl. No.: 09/996,964

(22) Filed: Nov. 30, 2001

(65) Prior Publication Data

US 2002/0066166 A1 Jun. 6, 2002

(30) Foreign Application Priority Data

Dec. 5, 2000 (DE) .......................... 100 60 236

(51) Int. Cl.[7] .................................... A44B 17/00
(52) U.S. Cl. ........................ 24/297; 24/458; 411/508
(58) Field of Search ......................... 24/297, 458, 293, 24/453; 277/630, 637, 640, 606, 616; 411/508–510, 913, 182

(56) References Cited

U.S. PATENT DOCUMENTS

| | | | | |
|---|---|---|---|---|
| 2,342,832 A | * | 2/1944 | Borchers | 292/17 |
| 2,946,612 A | * | 7/1960 | Ahlgren | 292/17 |
| 4,499,636 A | * | 2/1985 | Tanaka | 24/289 |
| 4,728,068 A | * | 3/1988 | Rivkin | 248/220.31 |
| 5,533,237 A | * | 7/1996 | Higgins | 24/289 |
| 5,542,158 A | * | 8/1996 | Gronau et al. | 24/295 |
| 5,649,783 A | * | 7/1997 | Ichikawa et al. | 403/386 |
| 5,852,854 A | * | 12/1998 | Pierrot et al. | 24/297 |
| 6,074,150 A | * | 6/2000 | Shinozaki et al. | 411/508 |
| 6,203,240 B1 | * | 3/2001 | Hironaka et al. | 403/397 |
| 6,353,981 B1 | * | 3/2002 | Smith | 24/295 |
| 6,381,811 B2 | * | 5/2002 | Smith et al. | 24/289 |
| 6,406,033 B1 | * | 6/2002 | Jessberger | 277/616 |
| 6,438,804 B1 | * | 8/2002 | Romero Magarino | 24/289 |

* cited by examiner

Primary Examiner—William L. Miller
Assistant Examiner—André L. Jackson
(74) Attorney, Agent, or Firm—Lowe Hauptman Gilman & Berner, LLP

(57) ABSTRACT

A clip member for sealing an opening in a sheet material includes a body which is fluid tight in an axial direction, at least one flange portion adapted to engage a surface of the sheet material, at least one resiliently deformable arm attached to the body and radially bendable relative to the body for facilitating introduction of the body into the opening and locking of the body in the opening, and a deformable film surrounding the arm. The film is tied on both the body and the flange portion to seal the opening and deformed concurrently with the deformation or bending of the arm. A locking portion is provided on the arm to engage an edge of the opening when the body is fit into the opening with a snapping action of the arm.

18 Claims, 1 Drawing Sheet

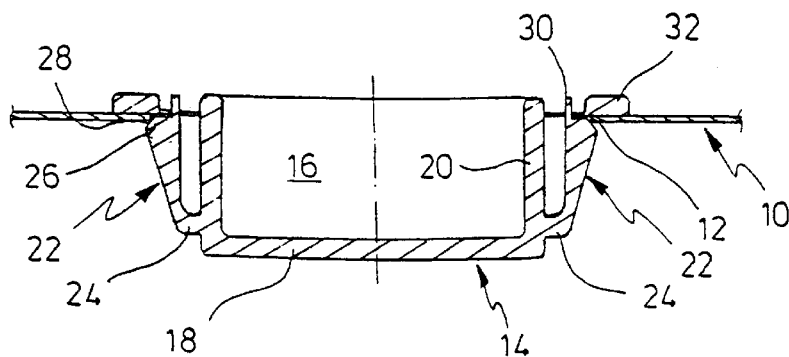
FIG.1
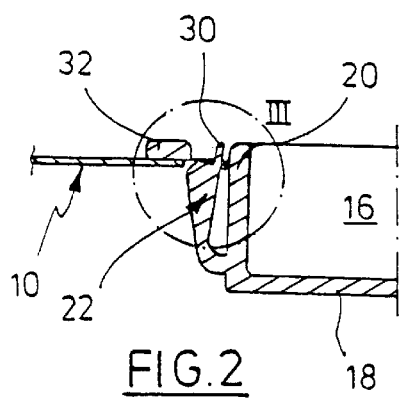
FIG.2
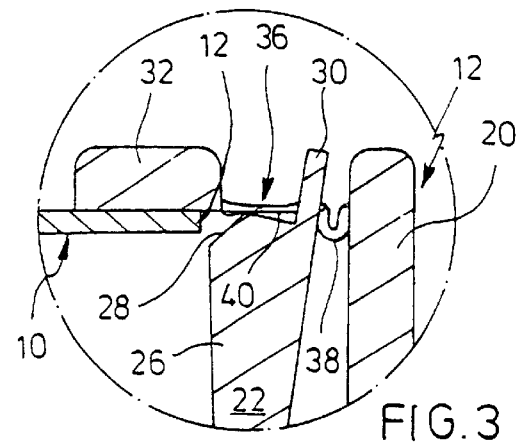
FIG.3
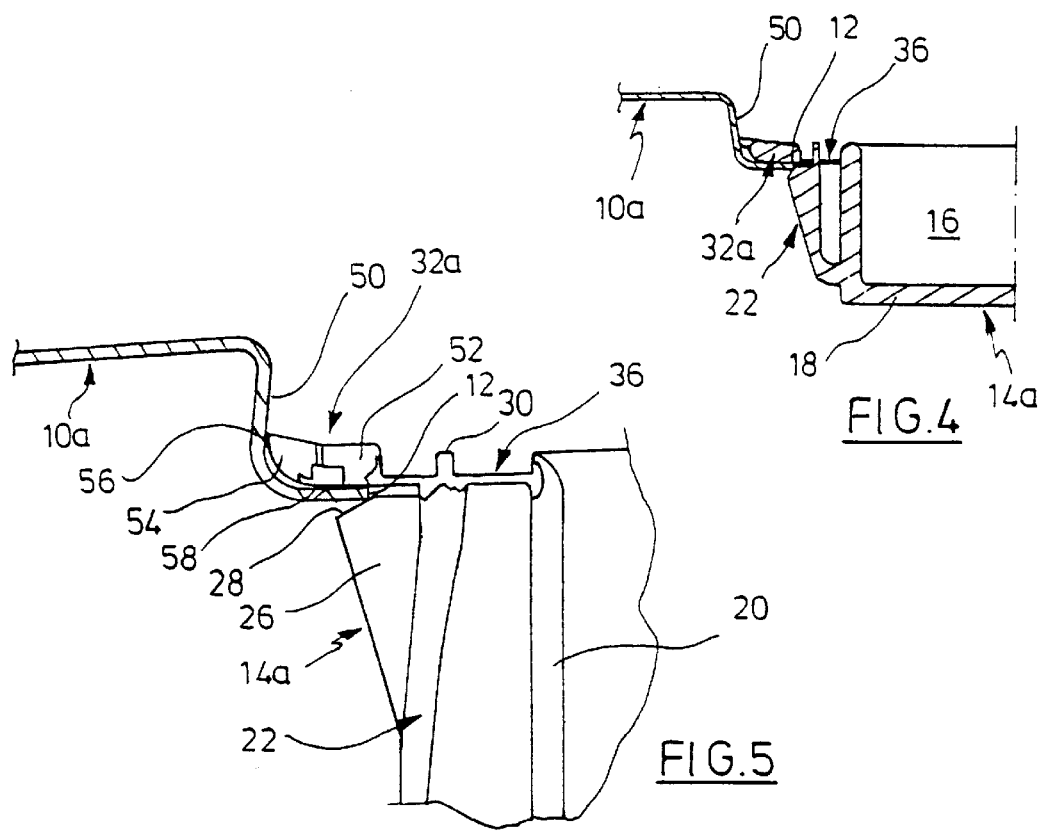
FIG.4
FIG.5

CLIP-LIKE MEMBER OF PLASTIC MATERIAL

FIELD OF THE INVENTION

This invention relates to a clip-like member of plastic material.

BACKGROUND ART

It is specifically in the automotive industry that lid-like or stopper-like members are used and are inserted into openings in the sheet metal material. It is known to configure such members like clips. In other words, they have resilient snapping portions or the like which are adapted to engage the opposed edge of an opening in order to secure the member in its seat. For instance, it is known to mount tank troughs of plastic material in an appropriate receptacle opening of the automotive body. It is also known to sealingly close holes which serve for making car paint flow out, for instance, with a lid-like stopper subsequently. Such a hole stopper also is mostly formed as a clip.

A low mounting force is aimed at for such members which are lockable via snap-in connections. A high retaining force needs to be achieved at the same time. It is true that the members which are known may be dismounted in most cases. However, since the locking or snapping portion is mostly located on that side of the metal sheet which is inaccessible the member requires to be destroyed in order to dismount it. Then, it will be impossible to use it again.

In many cases, the members are intended to be sealedly seated in the associated opening. It is known to apply extra sealing material to between a flange portion and that area of the carrier which surrounds the opening. However, a separate sealing member will increase the expenditure. It would also be imaginable to adhere a sealing ring or the like to the flange portion. This increases the expenditure as well. For reasons of stability or other reasons, it is mostly desirable that the member be made of relatively solid or hard material. Hard material, however, is difficult to use for realizing sufficient sealing.

SUMMARY OF THE INVENTION

It is the object of the invention to provide a clip-like member which can be sealingly inserted into an opening and is easily mountable and dismountable.

The object is achieved by the features of claim 1.

In the inventive clip-like member, a body is provided which is designed to be fluid-tight in an axial direction. A body of this type can be a lid which closes an opening, e.g. one in an automotive body metallic sheet, or a stopper. For instance, holes which allow car paint to flow out and through which car paint will exit after the painting operation are provided in the automotive body. These have to be tightly closed subsequently for reasons of anti-corrosive protection. The body may also be formed by a tank trough which is snapped into the skin of the automotive body. The feature which all bodies have in common is that they are particularly fluid-tight, on their part.

Another feature of the inventive member is that it can be snapped in by means of at least one snapping portion which is formed to the circumference of the body and is elastically deformable relative to the body. The snapping portion has a locking portion which engages the edge of the opening after undergoing temporary deformation and/or warping of the snapping portion while the body is inserted into the opening of the side opposing the flange portion. However, it is also known as such how to mount a body in a hole or opening in such a manner. The fact essential to the invention is that a thin, easily deformable portion which interconnects the locking portion with the body is provided between the snapping portion and the body or the flange portion. The thin, deformable portion is of a continuous shape and, thus, forms a closed portion between the flange portion and the body in the area of the snapping portion.

The fact that the thin portion can be easily deformed and, thus, is also deformed when the snapping portion is temporarily deformed while the body is being inserted does not noticeably increase the insertion force of the member. Therefore, the snapping portion can be designed in such a way that it requires a small mounting force, on one hand, but produces a large retaining force, on the other. Nevertheless, if such a construction is used a complete sealing by the member is obtained in the opening.

Although it is imaginable to form the film or thin portion, which provides for the member to be sealed, from the same material as that of the body. However, according to an aspect of the invention, it is an advantage if the body and the snapping portion are molded from a first material which is relatively hard and the thin portion is formed from a second, elastomeric material in a two-component injection molding step. An elastomeric material has the advantage that it may readily be folded or stretched depending on the direction of stress while the snapping portion undergoes deformation.

Another aspect of the invention provides that a handle portion of the snapping portion projects beyond the thin portion on the same side as the flange portion. In this way, it is possible to dismount the member, starting from the flange side. Any accessibility from the opposite side is unnecessary for disassembly.

The invention is particularly advantageous in an embodiment in which the snapping portion is formed as an arm which is formed to the outer circumference of the body at an axial distance from the flange portion, the arm having a locking shoulder at the outer side thereof which engages the edge of the opening. Mounting it merely requires to pivot the arm, which action requires relatively small forces. When in the mounted position, the arm is acted on by pressure when the member is loaded in the extracting direction. The arm is capable of absorbing a significant stress by pressure before it becomes possible to remove the member from the opening. However, it can be easily dismounted by simply pivoting the arm over the handle portion.

According to a further aspect of the invention, in order to provide tightness between the flange portion and the carrier material as well, it might be an advantage if a sealing portion made of an elastic material, which sealingly engages the associated carrier surface, is molded to the flange portion in a two-component injection mold method.

BRIEF DESCRIPTION OF THE DRAWINGS

Embodiments of the invention will now be explained with reference to the drawings.

FIG. 1 shows a section through an inventive member in an installed condition.

FIG. 2 shows how to actuate the member before it is dismounted.

FIG. 3 shows an enlarged portion of FIG. 2.

FIG. 4 shows a modification of the member of FIG. 1.

FIG. 5 shows a detail of FIG. 4 at a large magnification.

DETAILED DESCRIPTION OF THE INVENTION

Referring to FIG. 1, a metal sheet 10 can be seen, e.g. the skin of an automotive body. A hole or opening 12 is formed in the metal sheet 10. A member 14 the structure of which will be described in more detail below is seated in the opening 12.

The member 14 has a trough-like or pot-like body 16 with a bottom 18 and a circumferential wall 20. The contour of the wall 20 may be circular or of any other shape. A plurality of arms 22 are formed to the outer surface of the wall 20, i.e. via a web 24 close to the bottom 18. By the way, the arms 22, when relaxed, extend upwardly towards the opening of the body 16 approximately in parallel with the wall 20. The arms 22 have a snapping portion 26 which includes an oblique locking shoulder 28. The locking shoulder 28 engages the edge of the opening 12 that faces it. This efficiently retains the member 14 in the opening 12. Moreover, the arms 22 have a handle portion 30 towards the top.

A flange portion 32 which extends around the body 16, which fact is not shown in detail, is formed to the body 16 more radially towards the outside. The flange portion 32 engages the surface of the metal sheet 10 that faces it.

As is apparent from FIGS. 2 and 3 the arms 22 may be bent inwardly. The arms 22 are tied on or are formed so as to allow warping by an actuation of a hand. To this effect, the handle portion 30 is gripped and is pressed towards the body 16.

As is apparent from FIGS. 1 to 3 a film-like portion 36 is formed between the arms 22 and the body or wall 20 and the flange portion 32. It surrounds the arm 22 at the level of the handle portion 30 and is tied on both the flange portion 32 and the wall 20 as well as the portion (not shown) connecting the flange portion 32 and the wall 20. Hence, the portion 36 seals the area that surrounds the arm 22. Thus, the member 14 forms a sealing for the opening 12.

As ensues specifically from FIG. 3 the portion 36 is extremely flexible. Deforming or pivoting the arms causes the portion to be folded inwards on one side as is shown at 38 and to be stretched on the opposed side as is shown at 40.

The portion 36 is manufactured from an elastomeric material and is molded in a two-component injection molding method. The member 14, which is an integral part, by the way, is injection molded from a harder plastic material. The elastomeric material of the portion 36 only minimally increases the force required to deform the arms 22. Nevertheless, it creates a tight joint which prevents liquid, water in particular, from getting from one side of the metal sheet 10 to the other.

In the embodiment of FIGS. 4 and 5, those parts which are identical to those of the embodiment of FIGS. 1 to 3 are designated by the same reference numbers.

As can be seen from FIGS. 4 and 5 the carrier sheet 10a for the member 14a is provided with a hollow 50 in which there is an opening 50. The configurations of the arms and the film-like portion 36 are equal to those of FIGS. 1 to 3. Merely the flange portion 32a has been modified as can be seen particularly in FIG. 5. It can be recognized that an inner flange portion 52 and a radial outer flange portion 54 are provided which are intimately joined to each other with the radially outer flange portion 54, however, being made of an elastomeric material which is molded to the inner flange portion 52 in a two-component injection molding method. The outer flange portion 54 sealingly engages the metal sheet 10a by an edge at 56 and by another edge at 58. This manner causes the member 14a to be sealed even better.

The two embodiments allow to realize that it is also possible to dismount the member 14 or 14a in an easy way by starting from its flange end and grasping the handle portions 30 by which the locking shoulders 28 can be brought out of engagement with the edge of the opening 12.

What is claimed is:

1. A clip member of plastic material, comprising
    a body (14, 14a) fluid-tight in an axial direction which is adapted to be inserted into an opening of a carrier portion made of sheet material;
    at least one flange portion (32, 32a) which is adapted to engage one surface of the carrier portion;
    at least one arm (22) formed to a circumference of the body and being resiliently deformable and/or bendable relative to the body (14, 14a), the arm (22) having a locking portion (28) which is adapted to engage an edge of the opening opposite to the flange portion after the arm (22) is deformed and/or bent upon insertion of the body (14, 14a) into the opening in order to secure the body (14, 14a) in the opening;
    a deformable portion (36) which interconnects the arm (22) with the body (14, 14a) and the flange portion (32, 32a), with the deformable portion (36) being deformed concurrently with the deformation or bending of the arm (22), and sealing an area around the arm (22) relative to the body (14, 14a) and the flange portion (32, 32a).

2. The member of claim 1, wherein the body (14, 14a) and the arm (22) are formed of relatively hard material and the deformable portion (36) is formed in a two component injection molding step of elastomeric material.

3. The member of claim 1, wherein the deformable portion (36) is formed as a film.

4. The member of claim 1, wherein the deformable portion (36) is formed to the body (14, 14a) at a level of the flange portion (32, 32a).

5. The member of claim 1, wherein a handle portion (30) of the arm (22) projects beyond the deformable portion (36) on the same side as the flange portion.

6. The member of claim 1, wherein the arm (22) is formed to an outer circumference of body (14, 14a) at an axial distance from the flange portion (32, 32a), the arm having a locking shoulder (28) at an outer side thereof which is adapted to engage the edge of the opening.

7. The member of claim 1, wherein, in a two component injection mold method, a sealing portion (54) is molded to the flange portion (52), the sealing portion being of elastomeric material and adapted to sealingly engage the surface of the carrier portion.

8. The member of claim 1, wherein the flange portion (32, 32a, 52, 54) is biased against the surface carrier portion when the body is locked in the opening.

9. The member of claim 1, wherein the body (14, 14a) is shaped as a mold, a lid, or a plug.

10. A member for sealing an opening in a sheet material, said member comprising:
    a body which is fluid tight in an axial direction;
    at least one flange portion adapted to engage a surface of the sheet material;
    at least one resiliently deformable arm attached to said body and radially bendable relative to said body for facilitating introduction of said body into the opening and locking of said body in the opening; and
    a deformable film surrounding said arm, said film being tied on both said body and said flange portion to seal the opening.

11. The member of claim 10, wherein said film is made of an elastomeric material and said body and said flange portion are made of a material harder than the elastomeric material.

12. The member of claim 10, wherein said arm comprises a locking portion adapted to engage an edge of the opening.

13. The member of claim 10, wherein said film and said flange portion are substantially co-elevational.

14. The member of claim 10, wherein said arm comprises a connecting portion attached to said body, an intermediate portion where said film is attached to said arm, and a handle portion projecting from said intermediate portion in a direction away from the connecting portion.

15. The member of claim 10, wherein said arm comprises a connecting portion attached to said body, the connecting portion being at an axial distance from said flange portion.

16. The member of claim 10, wherein said flange portion comprises a sealing portion being made of an elastomeric material and adapted to sealingly engage the surface of the sheet material.

17. The member of claim 10, wherein said flange portion is biased against the surface of the sheet material when said body is locked in the opening.

18. The member of claim 10, wherein said body is shaped as one of a lid, a mold and a plug.

* * * * *